United States Patent
Mattes et al.

(10) Patent No.: US 6,297,641 B1
(45) Date of Patent: Oct. 2, 2001

(54) SIGNAL-PROCESSING CIRCUIT ARRANGEMENT FOR STATUS SIGNALS OF A RESISTIVE FOIL PRESSURE SENSOR

(75) Inventors: Bernhard Mattes, Sachsenheim; Werner Nitschke, Ditzingen; Wolfgang Drobny, Heilbronn; Otto Karl, Leonberg-Höfingen; Adrian Hanussek, Mühlacker-Lienzingen; Peter Schädler, Ludwigsburg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/254,107
(22) PCT Filed: Mar. 13, 1998
(86) PCT No.: PCT/DE98/00741
   § 371 Date: Feb. 24, 1999
   § 102(e) Date: Feb. 24, 1999
(87) PCT Pub. No.: WO99/00651
   PCT Pub. Date: Jan. 7, 1999

(30) Foreign Application Priority Data

Jun. 26, 1997 (DE) ............................................. 197 27 193

(51) Int. Cl.[7] .................................................. G01R 31/08
(52) U.S. Cl. ........................ 324/523; 324/609; 340/665; 340/667; 340/686.1
(58) Field of Search ........................ 324/523, 609, 324/767; 340/665, 667, 686.1

(56) References Cited

U.S. PATENT DOCUMENTS 4,301,403  11/1981  Hawkes et al. .
5,252,971 * 10/1993  Franz et al. ............................ 341/26
5,525,880 *  6/1996  Geringer et al. ..................... 318/446
5,959,538 *  9/1999  Schousek ............................. 340/665

FOREIGN PATENT DOCUMENTS 42 37 072    12/1993  (DE) .

* cited by examiner

Primary Examiner—Safet Metjahic
Assistant Examiner—Vincent Q. Nguyen
(74) Attorney, Agent, or Firm—Kenyon & Kenyon

(57) ABSTRACT

The simplified signal-processing circuit arrangement for processing and evaluating signals indicative of the status of an FSR-foil pressure sensor utilized in a seat-occupancy detection device, makes use of the fact that an application-oriented, integrated circuit, present in a motor vehicle having digital open-loop and closed-loop control functions implemented in a microcontroller MCU, contains a highly precise, switchable test-voltage source. One end of a circuit containing the FSR-foil is connected to a switching output VTA of the ASIC carrying the highly precise test voltage. The other end of this circuit is connected to a port of the MCU. A measuring voltage, which is a function of the status-contingent current intensity through the FSR-foil, drops off across a reference resistor connected in series to the FSR-foil, is fed to an analog-digital converter input of the MCU, and is converted therein into a digital signal indicating the occupancy status of the FSR-foil. Thus, using only one precise, switchable, d.c. voltage source, one port of the MCU and one ADC port, it is possible to evaluate the OCCUPIED/NOT OCCUPIED status of the FSR-foil, as well as to detect various fault conditions.

10 Claims, 3 Drawing Sheets

_US 6,297,641 B1_

SIGNAL-PROCESSING CIRCUIT ARRANGEMENT FOR STATUS SIGNALS OF A RESISTIVE FOIL PRESSURE SENSOR

FIELD OF THE INVENTION

The present invention relates to a signal-processing circuit arrangement for processing signals indicative of the status of at least one resistive foil pressure sensor made of an FSR foil having a diode D connected in parallel to the variable foil resistor. Currents of different flow direction are conducted through the foil pressure senser by a first and second voltage source that is connectible in each case to a first and second side of the foil pressure sensor. The diode in the foil pressure sensor is either forward-biased or reverse-biased in response to these currents, whose intensity, which is a function of the resistive status of the foil pressure sensor, yields correspondingly different measuring-voltage levels, which drop off across a reference resistor and are able to be detected as measuring signal ("FSR" means Force Sensing Resistor).

BACKGROUND INFORMATION

A conventional signal-processing circuit arrangement is described in a publication by the firm Interlink Electronics Europe, Echternach, LU (see information pertaining to FSR™-SBE sensor interface).

The characteristics and problems of a basic circuit of a signal-processing circuit arrangement described in the above publication are shown in FIGS. 4 and 5.

In FIG. 4, which shows a simplified, electrical equivalent circuit diagram of an FSR sensor, a pressure-variable foil resistor Rp is disposed between a first and second terminal 1,2, in parallel to a series connection of a diode D to a series resistor Rs. When, in response to a pressure-loaded state of the FSR foil, diode D is reverse-biased, its foil resistor Rp is able to be defined within a range of between 1 k$\Omega$ and approximately 40 k$\Omega$, depending on the size and construction type of the same. However, when the FSR foil is not in a pressure-loaded state, the value of this resistor Rp lies in a range above 60 k$\Omega$. When diode D is reverse-biased, a short-line fault of the FSR foil can also be detected, namely, when the resistance value of resistor Rp between input terminals 1 and 2 lies below approximately 0.5 k$\Omega$.

When diode D is forward-biased, a line interruption can be detected, since the main portion of the current then flows through resistor Rs, whose resistance value lies between 200$\Omega$ and 5 k$\Omega$.

The above description of FIG. 4 make it clear that an FSR foil having such properties is exceptionally suitable for use in a seat-occupancy detection device in motor vehicles when such an FSR foil is arranged, e.g., between the seat cover and a rubberized-hair mat of the seat (described in German Patent No. 42 37 072).

The above-described publication by the firm Interlink Electronics Europe includes a signal-processing circuit arrangement as shown in FIG. 5, which is suitable for evaluating the above-mentioned FSR-foil states with the aid of a microcontroller unit MCU. A first and a second external transistor $T_1$, $T_2$ are switchable on and off by two ports $Port_0$, $Port_1$ of the MCU. These transistors $T_1$, $T_2$, together with reference-voltage sources $V_{Ref+}$ and collector resistors $R_H$, $R_L$, in each case form a switchable voltage source which, with the aid of a low-pass filter TP1, TP2 for limiting interference, allows currents of different directions to flow through FSR-foil pressure sensor FSR, so that, depending on the polarity of the diode contained in FSR-foil pressure sensor FSR in conducting direction or blocking director, and depending on the status of FSR-foil pressure sensor FSF, different currents flow through FSR-foil pressure sensor FSR which are able to be sampled in the form of voltage signals at analog-digital converter inputs $ADC_0$, $ADC_1$ of microcontroller unit MCU. Microcontroller unit MCU samples the sensor states, program-controlled, in sequential phase sections. In the above-described, conventional signal-processing circuit arrangement shown in FIG. 5, the switching instants of external transistors $T_1$, $T_2$ cannot be brought exactly into agreement with the switching instants of sampling inputs $ADC_0$ and $ADC_1$ of the MCU. Disadvantageously, the known circuit arrangement also needs two analog-digital converter input ports $ADC_0$ and $ADC_1$, as well as two independent ports $Port_0$ and $Port_1$ of the MCU for detecting the status of an FSR foil. Since the discrete external transistors $T_1$ and $T_2$ have no "matching" behavior, because of tolerances occurring, the states of the FSR foil must be determined by a costly differential measurement. Disadvantageously, two of the analog-digital converter ports of microcontroller unit MCU, which are always scarce anyway, are needed per FSR foil to be evaluated.

SUMMARY OF THE INVENTION

Thus, the object of the present invention is to provide a signal-processing circuit arrangement, in which the number of components and the number of necessary A/D ports is reduced, and which, without a costly differential measurement, allows a highly accurate evaluation of the states of a resistive foil pressure sensor made of an FSR foil having a diode connected in parallel to a pressure-variable foil resistor.

A signal-processing circuit arrangement provides that the reference resistor is connected in series between the first side of the FSR foil and the second switchable voltage source, at least the first of the two switchable voltage sources is a highly precise test-voltage source, and that to check the OCCUPIED/NOT OCCUPIED status and to check for a short-circuit fault in the FSR foil, given a switched-off second voltage source, the circuit is connected from the first switched-on, highly precise test-voltage source, via the FSR foil and the reference resistor, to frame, the diode being reverse-biased in the fault-free case.

Thus, the measuring signal suitable for further processing, particularly for the A/D conversion, can be generated at the reference resistor, and the states of the FSR foil can be evaluated, advantageously using only one switchable, highly precise test-voltage source.

Among these states are not only the pressure-loaded state and the not pressure-loaded state, but also a short-circuit fault of the FSR foil.

By reversing the direction of the current flow, i.e. by switching off the highly precise test-voltage source (first voltage source) and switching on the second voltage source, the current flows through the reference resistor and the FSR foil, such that the diode is forward-biased. In this manner, a faulty line interruption can be detected. The last-named test is less accurate than the test of the OCCUPIED/NOT OCCUPIED status of the FSR foil, since the diode is; forward-biased, so that the normal "voltage source" is sufficient.

In addition, faulty shunts and short circuits of the FSR foil to an external voltage (e.g. $U_{bat}$) can be detected when both voltage sources are switched off and the circuit is connected on both sides of the FSR foil via the reference resistor to frame.

A preferred application of the signal-processing circuit arrangement for processing the signals supplied from an FSR foil is for detecting seat-occupancy in a motor vehicle. The highly precise test-voltage source is advantageously implemented in an application-oriented (user-specific), integrated circuit (ASIC) already present, and the second voltage source can be implemented through a port of a microcontroller MCU. In this case, it is advantageous to Seed the measuring signal to an analog-digital converter input of the microcontroller. The reference voltage of the analog-digital converter of the microcontroller is made identical to the d.c. voltage of the test-voltage source in the application-oriented, integrated circuit.

It is possible to improve the measuring circuit, in that both switchable voltage sources are formed in each case by a highly precise test-voltage source, each of which is implemented in an application-oriented, integrated circuit.

When the states of a plurality of seat-occupancy mats in the motor vehicle, each provided with an FSR foil, must be detected separately, a plurality of identical circuits, each having an FSR foil in series connection with a reference resistor, are connected in parallel between the two switchable test-voltage sources. In this case, the microcontroller can have a plurality of analog-digital converter inputs, to which the measuring signals, dropping off in each case across the reference resistors, are separately fed.

Further features and advantages of the signal-processing circuit arrangement of the present invention are described in the following with reference to preferred exemplary embodiments shown in the drawings, used, by way of example, in a motor-vehicle seat-occupancy detection device working with an FSR foil.

DETAILED DESCRIPTION

The signal-processing circuit arrangement according to the present invention is not limited to an application for a seat-occupancy detection in a motor vehicle, and can be used for other applications.

Figure 1:
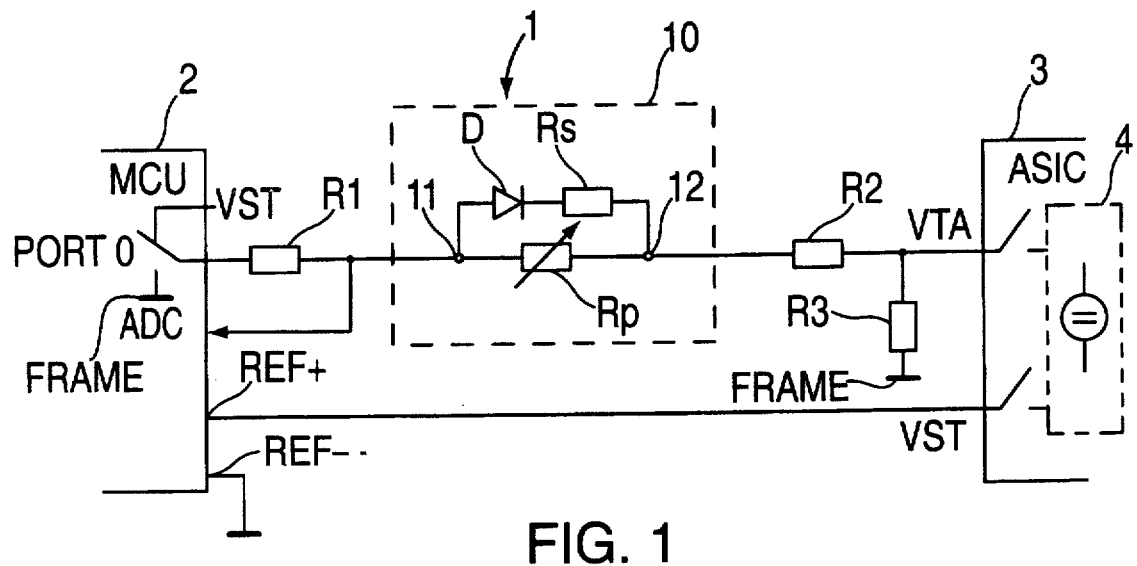
FIG. 1 shows a first exemplary embodiment of a signal-processing circuit arrangement for evaluating the seat-occupancy status in a motor vehicle according to the present invention.

In the circuit configuration shown in FIG. 1, a first exemplary embodiment of the present invention, provides a signal-processing circuit arrangement 1, which contains FSR foil 10 in series with a signal-processing circuit arrangement in a circuit between a microcontroller unit (MCU) 2 and a highly precise, switchable d.c. voltage source 4 in an application-oriented, integrated circuit (ASIC) 3. The circuit of signal-processing circuit arrangement 1 contains reference resistor $R_1$, whose one end is connected to a switching output of MCU 2, designated as $port_0$, and whose other end is connected, first of all, to a terminal side 11 of FSR foil 10, and furthermore to an analog-digital converter input ADC of MCU 2. The other terminal side 12 of FSR foil 10 is connected via a series resistor $R_2$ to a terminal VTA of highly precise, switchable d.c. or test-voltage source 4 contained in ASIC 3. In addition, a further resistor $R_3$ is connected from this connecting point VTA to frame. Resistor $R_3$ connects the right side 12 of FSR foil 10 to frame via resistor $R_2$ when the voltage at output VTA is switched off. The output at terminal VTA is then highly resistive. In the case of ASICs in which the VTA can also be connected to frame, resistor $R_3$ can be omitted.

A further switching output VST of ASIC 3 is the uniform d.c. voltage supply which is carried to an input Ref+ of MCU 2. Ref+ is the positive reference voltage of the analog-digital converter of MCU 2. Ref− is the negative reference voltage of the analog-digital converter of MCU 2 and is connected to frame. By utilizing the precise measuring arrangement contained in ASIC 3, i.e. the highly precise test-voltage source 4, which is a basic function of ASIC 3, it is possible to eliminate a costly differential measurement. Due to the shared "bandgap" and the "matching", switching outputs VTA and VST are identical. The offset in ASIC 3 is approximately 4 mV. A low-order bit (1 LSB) is represented in the system by 22 mV. "Bandgap" signifies reference-voltage source for VTA and VST, "matching" denotes the synchronous behavior of VTA and VST.

An operation of the signal-processing circuit arrangement in FIG. 1 is described below. The task of the circuit arrangement is the reliable detection of the states "OCCUPIED/NOT OCCUPIED" of FSR foil 10, as well as of diverse fault cases. This is done, as described above, by evaluating the variable resistance value of resistor Rp of FSR-foil 10.

To carry out the measurements, d.c. current is supplied in two different flow directions through the circuit from ASIC 3 to MCU 2 and in reverse. When, given a switched-off voltage source VST of MCU 2 ($port_0$ is then connected to frame), the current flows from output VTA of switchable, highly precise test-voltage source 4 to $port_0$, then diode D of FSR-foil 10 is reverse-biased. In this context, the following values can be yielded for the resistor value Rp and, as a function thereof, the following states of the FSR foil.

| Reverse-biased diode D: | |
| --- | --- |
| Rp < 0.5 kΩ | Short-circuit fault |
| Rp = 0.5 kΩ . . . 1.0 kΩ | Gray range |
| Rp = 1.0 kΩ . . . 40 kΩ | FSR-foil pressure-loaded - seat occupied |
| Rp = 40 kΩ . . . 60 kΩ | Gray range |
| Rp > 60 kΩ | FSR-toil not pressure-loaded - seat not occupied. |

If, given a switched-off, highly precise test-voltage source of ASIC 3, the d.c. current flows from voltage source VST of MCU 2 from left to right via resistor $R_3$ to frame, then diode D is forward-biased. The normal switching output VST at $port_0$ of MCU 2 is used for the imprecise "forward-biased diode" test.

| Forward-biased diode D: | |
| --- | --- |
| Rp = 1.5 kΩ ... 40 kΩ | Gray range |
| Rp > 40 kΩ | Interruption, fault |
| 200 Ω < Rs < 5 kΩ | No line interruption |

The above-designated, different states of the FSR-foil are detected by evaluating, with the assistance of the analog-digital converter contained in MCU 2, the voltage dropping off across reference resistor $R_1$. The analog-digital converter receives the voltage at output VST of ASIC 3 as positive reference voltage Ref. It should be mentioned that, in ASIC 3, VST and VTA are derived from the same voltage reference. The voltage difference is minimal and has no effect on the accuracy of the measurement. When highly precise test-voltage source VTA of ASIC 3 is switched in, the voltage potential at the VTA output is equal to stabilized voltage VST.

Preferably, resistor value $R_1$ is selected to be on the order of magnitude of variable resistor Rp of FSR-foil 10 to be measured. On the other hand, resistor $R_2$ is low-resistance. Resistor $R_3$ connects the right terminal side 12 of FSR foil 10 to frame via resistor R2 when VTA is switched off; output VTA is then highly resistive. As discussed above, resistor $R_3$ can be omitted if VTA can also be connected to frame.

Shunts or short circuits to an external voltage, particularly to the battery voltage $U_{bat}$ of the motor vehicle, are detected when VTA is switched off and the switching output at $port_0$ of MCU 2 is connected to frame.

In an exemplary circuit, the following resistance values of the signal-processing circuit arrangement may be selected:

$R_1$=10 kΩ; $R_2$, $R_3$=500Ω.

This arrangement allowed reliable detection of the states of the FSR-foil.

Figure 2:
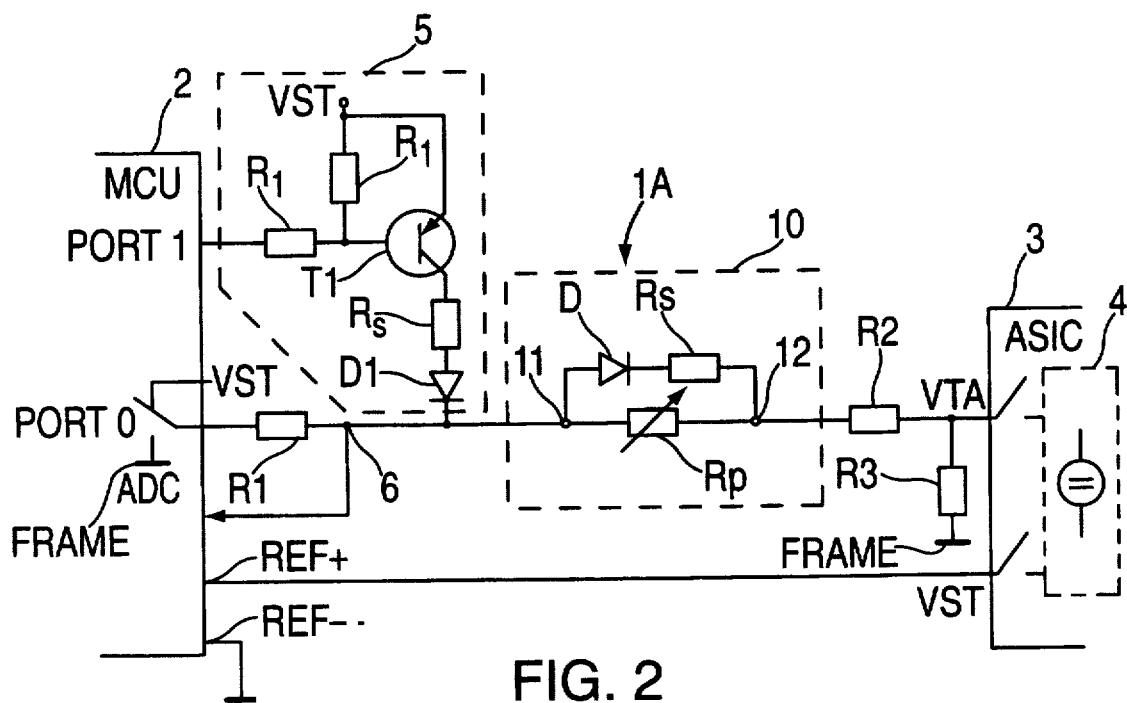
FIG. 2 shows a second exemplary embodiment of the signal-processing circuit arrangement illustrated in FIG. 1, whose measuring range is expanded by an additionally connectable current source.

In the second exemplary embodiment 1A of the signal-processing circuit arrangement of the present invention shown in FIG. 2, whose functioning is largely identical to the signal-processing circuit arrangement described above and shown in FIG. 1, an additional switchable direct-current source 5 is used for expanding the measuring range, in case the normal switching output at $port_0$ of MCU 2 cannot supply the necessary testing current. Additional switchable direct-current source 5 is implemented in the conventional manner, and feeds the testing current into the right side of reference resistor $R_1$, where reference resistor R is connected to left terminal side 11 of FSR-foil 10 and to input ADC of MCU 2. Additional testing-current source 5 is connected to a further $port_1$. The other features, characteristics and functioning of the circuit arrangement shown in FIG. 2 correspond to the circuit features and functions shown in FIG. 1. However, an additional port of MCU 2 is utilized.

Figure 3:
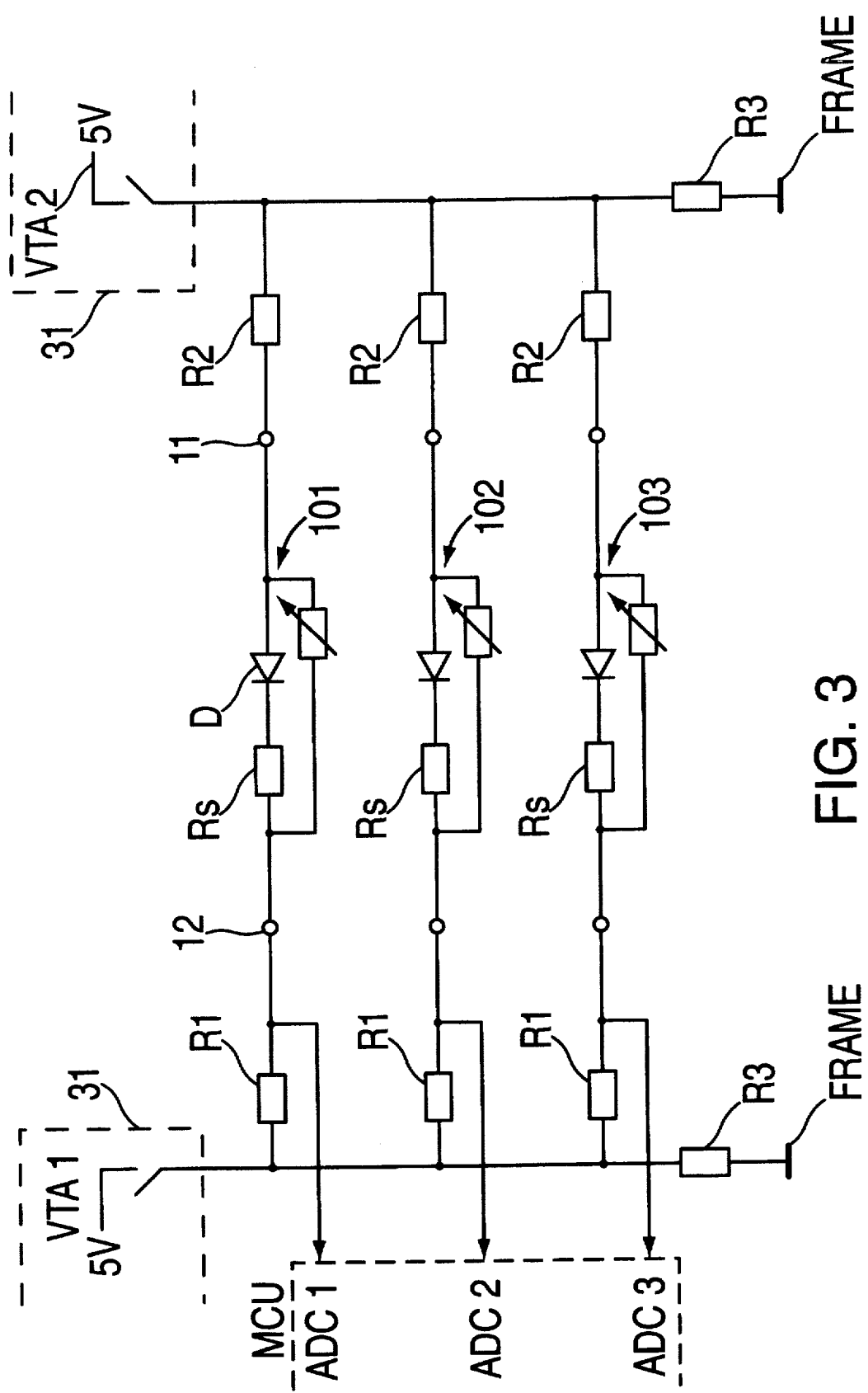
FIG. 3 shows a third exemplary embodiment of the signal-processing circuit arrangement according to the present invention for a separate detection of seat-occupancy in for several FSR foil mats.
Figure 4:
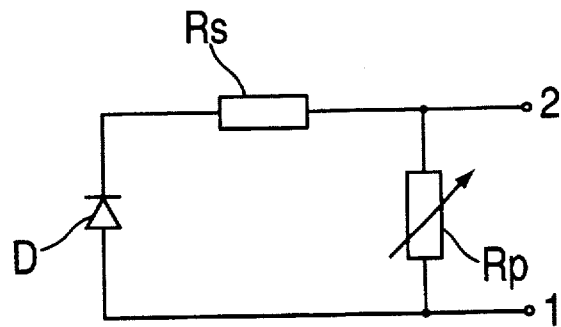
FIG. 4 shows a circuit diagram of a conventional FSR-foil sensor.
Figure 5:
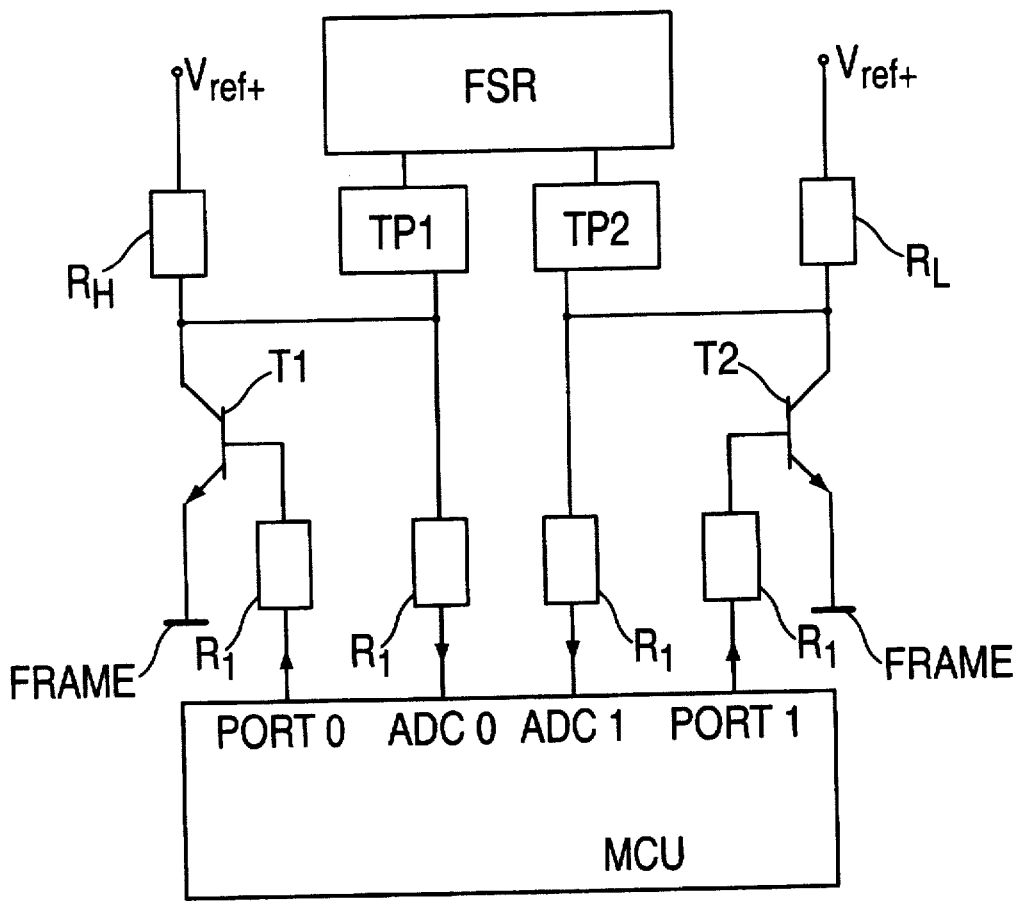
FIG. 5 shows a conventional signal-processing circuit arrangement for evaluating states of the FSR-foil sensor.

In the third exemplary embodiment of the signal-processing circuit arrangement of the present invention shown in FIG. 3, a plurality of FSR-foils 101, 102, 103 for separate detection of the occupancy of a plurality of seats in the motor vehicle are switched, in each case in the basic circuit arrangement shown in FIG. 1, into an identical circuit in parallel between two identical ASICs 31 and 32, each having a switchable voltage source $VTA_1$ and $VTA_2$. Tappings from reference resistors $R_1$ are each carried separately to analog-digital converter inputs $ADC_1$, $ADC_2$, $ADC_3$ of an MCU, and there, can be separately evaluated. Otherwise, the measuring principle is the same as described above.

What is claimed is:

1. A signal-processing circuit arrangement for processing at least one signal, comprising:

a force sensing resistor (FSR) foil forming at least one resistive foil pressure sensor, the at least one signal indicating a status of the at least one resistive foil pressure sensor, the FSR foil including a variable foil resistor and a diode coupled in parallel with the variable foil resistor;

a first switchable voltage source being a highly precise test-voltage source and providing a first current in a first flow direction through the at least one resistive foil pressure sensor, the first switchable voltage source being configured to connect to a first terminal side of the FSR foil;

a second switchable voltage source providing a second current in a second flow direction through the at least one resistive foil pressure sensor, the second switchable voltage source being configured to connect to a second terminal side of the FSR foil, the first flow direction being different from the second flow direction; and a reference resistor connected in series between the second terminal side of the FSR foil and the second switchable voltage source, wherein each of the first and second currents has a respective intensity which is a function of a respective resistance value of the variable foil resistor to generate different measuring-voltage levels, the different measuring-voltage levels decreasing across the reference resistor and being detectable as measuring signals, wherein the diode is one of forward-biased and reverse-biased as a function of the first and second currents, wherein, when the first switchable voltage source is switched-on and the second switchable voltage source is switched-off, the first switchable voltage source is coupled to a ground frame via the FSR foil and via the reference resistor to determine if the FSR foil is in an OCCUPIED/NOT OCCUPIED state and if the FSR foil his a short-circuit fault, and wherein the diode is reverse-biased if the FSR foil does not have the short-circuit fault.

2. The signal-processing circuit arrangement according to claim 1, wherein, when the first switchable voltage source is switched-off, the second switchable voltage source is switched-on and the diode is forward-biased, the second switchable voltage source is coupled to the ground frame via the reference resistor and via the FSR foil to detect a faulty line interruption.

3. The signal-processing circuit arrangement according to claim 1, wherein, to detect one of faulty shunts and short circuits to an external voltage, the first and second switchable voltage sources are switched-off, and the FSR foil is coupled to the ground frame via the reference resistor.

4. The signal-processing circuit arrangement according to claim 1, further comprising:

an application-oriented integrated circuit including the first switchable voltage source; and a microcontroller including a port for providing the second current generated by the second switchable voltage source arid an analog-digital converter having an input for receiving the measuring signals to be converted, wherein a reference voltage provided by the analog-digital converter is identical to a voltage of generated by the first switchable voltage source.

5. The signal-processing circuit arrangement according to claim 1, further comprising:

a further resistor having a resistance value which is lower than a resistance value of the reference resistor, wherein the further resistor is coupled in series to the first terminal side of the FSR foil to be positioned opposite to the reference resistor.

6. The signal-processing circuit arrangement according to claim 1, wherein the reference resistor has a resistance value which is on an order of magnitude of the variable foil resistor.

7. The signal-processing circuit arrangement according to claim 1, further comprising:

a microcontroller having a port; and a switchable current source coupled to a junction point between the reference resistor and the FSR foil, wherein the switchable current source is connectable and disconnectable from the port of the microcontroller.

8. The signal-processing circuit arrangement according to claim 1, wherein each of the first and second switchable voltage sources is switchable from a respective nominal voltage potential to the ground frame.

9. The signal-processing circuit arrangement according to claim 1, further comprising:

an application-oriented integrated circuit including the first and second switchable voltage sources, wherein the second switchable voltage source is a further highly precise test-voltage source.

10. The signal-processing circuit arrangement according to claim 9, further comprising:

a plurality of identical circuits, each having a respective FSR foil coupled in series to the reference resistor and connected in parallel between the first and second switchable voltage sources; and a microcontroller including a plurality of analog-digital converter inputs for individually receiving the measuring signals.

* * * * *

UNITED STATES PATENT AND TRADEMARK OFFICE
CERTIFICATE OF CORRECTION

PATENT NO. : 6,297,641 B1
DATED : October 2, 2001
INVENTOR(S) : Mattes Bernhard et al.

It is certified that error appears in the above-identified patent and that said Letters Patent is hereby corrected as shown below:

<u>Column 1,</u>
Line 10, change "direction" to -- directions --
Line 51, change "mctor" to -- motor --

<u>Column 3,</u>
Line 8, change "Seed" to -- Feed --

<u>Column 6,</u>
Line 63, change "arid" to -- and --

Signed and Sealed this

Twenty-eighth Day of January, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,297,641 B1  
DATED : October 2, 2001  
INVENTOR(S) : Mattes Bernhard et al.

It is certified that error appears in the above-identified patent and that said Letters Patent is hereby corrected as shown below:

Column 1,  
Line 10, change "direction" to -- directions --  
Line 51, change "mctor" to -- motor --

Column 3,  
Line 8, change "Seed" to -- seed --

Column 6,  
Line 63, change "arid" to -- and --

Signed and Sealed this

Eleventh Day of March, 2003

JAMES E. ROGAN  
*Director of the United States Patent and Trademark Office*